United States Patent
Yoon et al.

(10) Patent No.: US 9,990,538 B2
(45) Date of Patent: Jun. 5, 2018

(54) FACE RECOGNITION APPARATUS AND METHOD USING PHYSIOGNOMIC FEATURE INFORMATION

(71) Applicant: ELECTRONICS AND TELECOMMUNICATIONS RESEARCH INSTITUTE, Daejeon (KR)

(72) Inventors: Ho-Sub Yoon, Daejeon (KR); Kyu-Dae Ban, Daejeon (KR); Young-Woo Yoon, Daejeon (KR); Jae-Hong Kim, Daejeon (KR)

(73) Assignee: ELECTRONICS AND TELECOMMUNICATIONS RESEARCH INSTITUTE, Daejon (KR)

( * ) Notice: Subject to any disclaimer, the term of this patent is extended or adjusted under 35 U.S.C. 154(b) by 0 days. days.

(21) Appl. No.: 15/089,944

(22) Filed: Apr. 4, 2016

(65) Prior Publication Data
US 2017/0193284 A1 Jul. 6, 2017

(30) Foreign Application Priority Data
Jan. 5, 2016 (KR) ........................ 10-2016-0001244

(51) Int. Cl.
*G06K 9/00* (2006.01)
*G06K 9/62* (2006.01)

(52) U.S. Cl.
CPC ..... *G06K 9/00275* (2013.01); *G06K 9/00248* (2013.01); *G06K 9/00281* (2013.01); *G06K 9/00288* (2013.01); *G06K 9/6215* (2013.01)

(58) Field of Classification Search
None
See application file for complete search history.

(56) References Cited

U.S. PATENT DOCUMENTS 5,802,208 A * 9/1998 Podilchuk .......... G06K 9/00221
382/115
2005/0147292 A1* 7/2005 Huang ............... G06K 9/00228
382/159

(Continued)

FOREIGN PATENT DOCUMENTS

| KR | 10-2005-0022676 A | 3/2005 |
| KR | 10-2005-0060628 A | 6/2005 |
| KR | 10-2008-0049394 A | 6/2008 |

OTHER PUBLICATIONS

Automatic Physiognomic analysis by classifying facial components, Hee-Deok Yang et al., IEEE, 0-7695-2521-0, 2006, pp. 1-4.*

(Continued)

*Primary Examiner* — Jayesh A Patel
(74) *Attorney, Agent, or Firm* — LRK Patent Law Firm

(57) ABSTRACT

A face recognition technology using physiognomic feature information, which can improve the accuracy of face recognition. For this, the face recognition method using physiognomic feature information includes defining standard physiognomic types for respective facial elements, capturing a facial image of a user, detecting information about facial elements from the facial image, and calculating similarity scores relative to the standard physiognomic types for respective facial elements of the user based on the facial element information.

8 Claims, 15 Drawing Sheets

(56) References Cited

U.S. PATENT DOCUMENTS

2006/0210168 A1* 9/2006 Kim .................. G06K 9/00275
382/203
2010/0128938 A1 5/2010 Chung et al.
2013/0163829 A1 6/2013 Kim et al.

OTHER PUBLICATIONS

Microsoft Kinect Sensor and Its Effect, Wenjun Zeng, IEEE, 0170-986X, 2012, pp. 4-10.*

* cited by examiner

TYPE A: ROUNDED CHIN

TYPE B: BRANCHIAL CHIN

TYPE C: POINTED CHIN

TYPE D: ANGULAR CHIN

TYPE E: SQUARE CHIN

TYPE A: CLEFT CHIN

TYPE B: ASYMMETRIC CHIN

TYPE C: DOUBLE CHIN

DOUBLE EYELIDS

SINGLE EYELIDS

FACE WITH LONG INTEROCULAR DISTANCE

FACE WITH SHORT INTEROCULAR DISTANCE

TYPE A: SPOT ON NOSE

TYPE B: SPOT BELOW EYE

TYPE A: NASOLABIAL FOLDS

TYPE B: FOREHEAD WRINKLES

TYPE A: HIGH NOSE

TYPE B: FLAT NOSE

TYPE C: HOOKED NOSE

TYPE A: ELONGATED EYES

TYPE B: LARGE ROUND EYES

TYPE C: DOWNTURNED EYES

TYPE D: DROOPY HOOKED EYES

FACE RECOGNITION APPARATUS AND METHOD USING PHYSIOGNOMIC FEATURE INFORMATION

CROSS REFERENCE TO RELATED APPLICATION

This application claims the benefit of Korean Patent Application No. 10-2016-0001244, filed Jan. 5, 2016, which is hereby incorporated by reference in its entirety into this application.

BACKGROUND OF THE INVENTION

1. Technical Field

The present invention relates generally to a face recognition apparatus and method using physiognomic feature information and, more particularly, to a face recognition apparatus and method using physiognomic feature information, which can improve the accuracy of face recognition.

2. Description of the Related Art

With the development of information-oriented society, identification technology for identifying each individual becomes more and more important. A lot of research into biometric technology that uses human body features to protect personal information and identify respective individuals using computers has been conducted.

Biometric technology, particularly face recognition technology, is considered to be convenient and competitive biometric technology, owing to the advantage thereof wherein the identity of a user can be verified in a contactless manner, unlike recognition technology requiring a special action or behavior on the part of the user, such as fingerprint recognition or iris recognition. Face recognition technology is one of core technologies for a multimedia database (DB) search, and has been widely used in various application fields such as preparing synopses of video containing facial information, identity verification, Human Computer Interface (HCI) image search, security, and monitoring systems.

Conventional face recognition schemes using cameras have been realized in such a way as to use global information about the face, or peripheral information about feature points for determining facial elements. However, when a person recognizes the face of another person, he or she occasionally uses the overall shape of the face, but tends to recognize the face of that person using the unique physiognomic features of the face. That is, information about whether a person has double eyelids, a spot at a specific location, a pointed chin, elongated eyes, or wrinkles at a specific location is used as important information required to identify the person.

In relation to this, Korean Patent Application Publication No. 2008-0049394 discloses technology entitled "Preprocessing Method for Face Recognition, Face Recognition Method, and Apparatus Using the Same".

SUMMARY OF THE INVENTION

Accordingly, the present invention has been made keeping in mind the above problems occurring in the prior art, and an object of the present invention is to implement technology for automatically recognizing the face of each person using physiognomic feature information, which is regarded as an important factor when the person recognizes a face. Another object of the present invention is to improve the accuracy of face recognition by utilizing various types of physiognomic feature information when performing face recognition.

A further object of the present invention is to provide more accurate face recognition technology by merging face recognition based on physiognomic feature information with existing face recognition based on global features and the locations of facial elements.

In accordance with an aspect of the present invention to accomplish the above objects, there is provided a face recognition method using physiognomic feature information, including defining standard physiognomic types for respective facial elements; capturing a facial image of a user; detecting information about facial elements from the facial image; and calculating similarity scores relative to the standard physiognomic types for respective facial elements of the user based on the facial element information.

Defining the standard physiognomic types may be configured such that the facial elements include at least one of eyes, a nose, a mouth, a chin, spots, and wrinkles, and the standard physiognomic types are defined based on at least one of an interocular distance, presence/absence of double eyelids, a size of the eyes, a size and a shape of the nose, a shape of the chin, locations and shapes of the spots, and locations and shapes of the wrinkles.

The face recognition method may further include determining similarities to facial data registered in advance in a face database (DB) based on the calculated similarity scores.

The face recognition method may further include, after capturing the facial image of the user, performing basic face recognition using global features of a face in the facial image and locations of the facial elements, wherein determining the similarities may be configured to determine similarities to the facial data registered in advance in the face DB based on the calculated similarity scores and results of the basic face recognition.

Determining the similarities may be configured to assign weights to the similarity scores and to the results of the basic face recognition, respectively, and to determine similarities to the facial data registered in advance in the face DB.

The weights assigned to the similarity scores and to the results of the basic face recognition may have values that are greater than 0 and less than 1, and a total sum of the weights assigned to the similarity scores and to the results of the basic face recognition may be 1.

Defining the standard physiognomic types may be configured to, when the facial elements correspond to the chin, define at least one of normal chin types including a rounded chin, a branchial chin, a pointed chin, an angular chin, and a square chin, and special chin types including a cleft chin, an asymmetric chin, and a double chin, as the standard physiognomic types for the chin based on preset criteria.

Defining the standard physiognomic types may be configured to, when the facial elements correspond to the spots or wrinkles, define the standard physiognomic types depending on locations, shapes, and a number of spots or wrinkles based on preset criteria.

Determining the similarities may be configured to define standard physiognomic types of the face of the user based on the similarity scores relative to standard physiognomic types, which are calculated for respective facial elements of the user, and determine similarities only to facial data stored in types identical to the defined standard physiognomic types in the face DB.

The face recognition method may further include, after detecting the facial element information, performing preprocessing for normalizing a size of a face in the facial image based on the facial element information, wherein calculating the similarity scores is configured to calculate similarity scores based on the facial element information of the facial image on which the preprocessing has been performed.

Capturing the facial image of the user may be configured to capture the facial image of the user using a normal camera and a 3D depth camera.

In accordance with another aspect of the present invention to accomplish the above objects, there is provided a face recognition apparatus using physiognomic feature information, including a standard type definition unit for defining standard physiognomic types for respective facial elements; an image-capturing unit for capturing a facial image of a user; a detection unit for detecting information about facial elements from the facial image; and a score calculation unit for calculating similarity scores relative to the standard physiognomic types for respective facial elements of the user based on the facial element information.

The facial elements may include at least one of eyes, a nose, a mouth, a chin, spots, and wrinkles, and the standard type definition unit may define the standard physiognomic types based on at least one of an interocular distance, presence/absence of double eyelids, a size of the eyes, a size and a shape of the nose, a shape of the chin, locations and shapes of the spots, and locations and shapes of the wrinkles.

The face recognition apparatus may further include a similarity determination unit for determining similarities to facial data registered in advance in a face database (DB) based on the similarity scores.

The face recognition apparatus may further include a basic face recognition unit for performing basic face recognition using global features of a face in the facial image and locations of the facial elements, wherein the similarity determination unit determines similarities to the facial data registered in advance in the face DB based on the calculated similarity scores and results of the basic face recognition.

The similarity determination unit may assign weights to the similarity scores and to the results of the basic face recognition, respectively, and determine similarities to the facial data registered in advance in the face DB.

The weights assigned to the similarity scores and to the results of the basic face recognition may have values that are greater than 0 and less than 1, and a total sum of the weights assigned to the similarity scores and to the results of the basic face recognition may be 1.

The face recognition apparatus may further include a normalization unit for normalizing a size of a face in the facial image based on the facial element information, wherein the score calculation unit calculates similarity scores based on the facial element information of the normalized facial image.

The similarity determination unit may define standard physiognomic types of the face of the user based on the similarity scores relative to the standard physiognomic types, which are calculated for respective facial elements of the user, and determines similarities only to facial data stored in types identical to the defined standard physiognomic types in the face DB.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
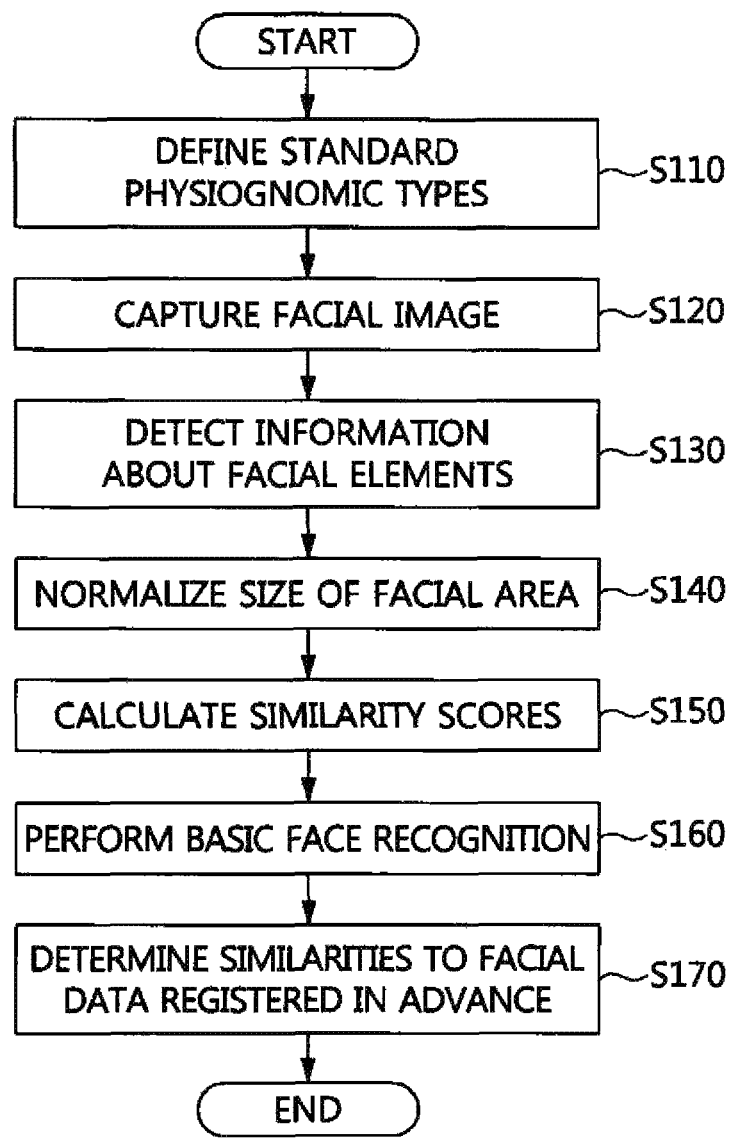
FIG. 1 is a flowchart showing a face recognition method using physiognomic feature information according to an embodiment of the present invention.
Figure 2:
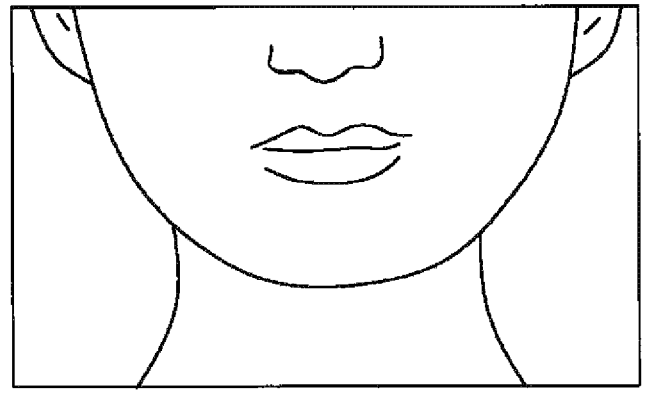
FIGS. 2 to 6 are diagrams showing the classification of normal chin types based on physiognomic feature information.
Figure 3:
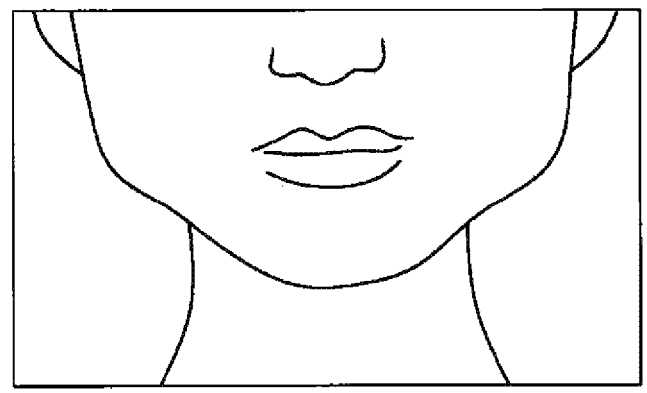
Figure 4:
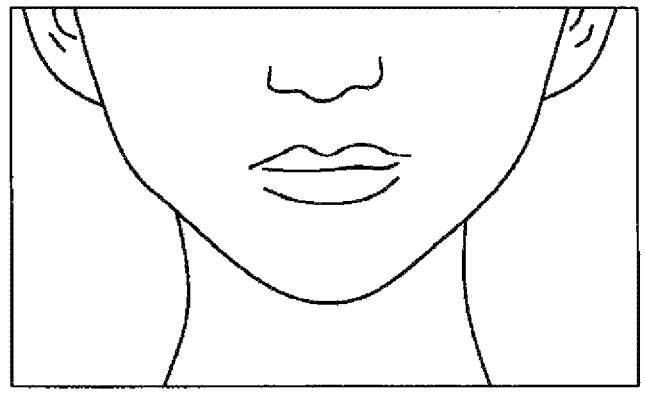
Figure 5:
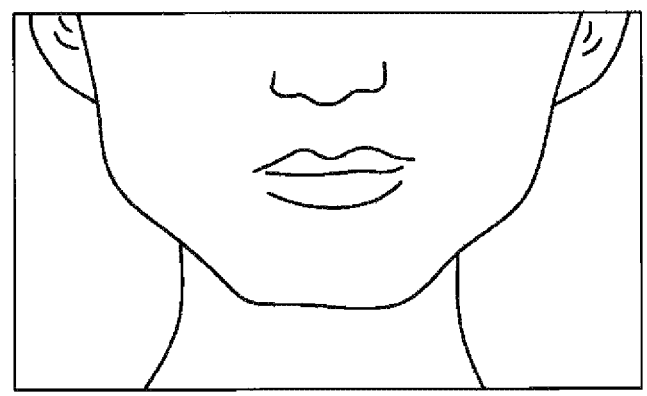
Figure 6:
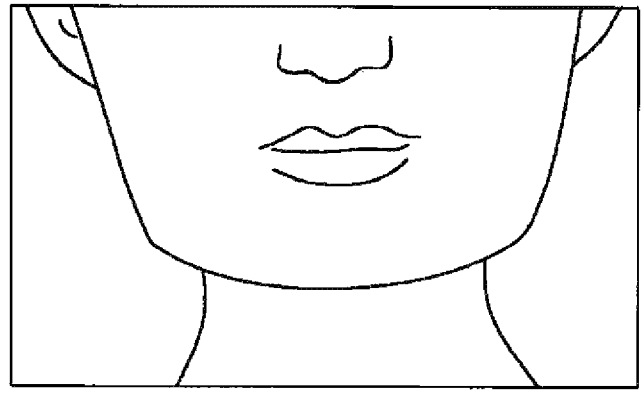

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter a face recognition method using physiognomic feature information according to an embodiment of the present invention will be described.

FIG. 1 is a flowchart showing a face recognition method using physiognomic feature information according to an embodiment of the present invention.

Referring to FIG. 1, the face recognition method using physiognomic feature information according to the embodiment of the present invention defines standard physiognomic types for respective facial elements at step S110. At step S110, the facial elements include at least one of eyes, a nose, a mouth, a chin, spots, and wrinkles, and the standard physiognomic types may be defined based on at least one of an interocular distance, the presence/absence of double eyelids, the size of the eyes, the size and shape of the nose, the shape of the chin, the locations and shapes of the spots, and the locations and shapes of the wrinkles. A detailed description of the standard physiognomic types for respective facial elements will be made with reference to FIGS. 2 to 26.

Further, a facial image of a user is captured at step S120. Here, the facial image may be captured using a normal camera and a three-dimensional (3D) depth camera.

Information about the facial elements of the user is detected from the facial image, captured at step S120, at step S130. Thereafter, preprocessing for normalizing the size of the face in the facial image based on the facial element information may be performed at step S140.

Furthermore, similarity scores relative to the standard physiognomic types for respective facial elements of the user are calculated based on the facial element information at step S150. Here, the similarity scores may be calculated based on the facial element information of the facial image on which preprocessing has been performed at step S140.

Next, basic face recognition may be additionally performed based on the global features of the face in the facial image and the locations of the facial elements at step S160.

Similarities to facial data registered in advance in a face DB are determined based on the similarity scores, calculated at step S150, at step S170. At step S170, the similarities to the facial data registered in advance in the face DB may be determined based both on the similarity scores calculated at step S150 and on the results of the basic face recognition performed at step S160. Here, the similarities may be determined after weights are assigned to the similarity scores and to the results of the basic face recognition, respectively. Further, the weights assigned to the similarity scores and to the results of the basic face recognition have values that are greater than 0 and less than 1. The total sum of the weights assigned to the similarity scores and to the results of the basic face recognition may be 1.

At step S170, based on the similarity scores relative to the standard physiognomic types, which are calculated for respective facial elements of the user, the standard physiognomic types of the face of the user are defined, and then similarities only to pieces of facial data stored in the same types as the defined standard physiognomic types in the face DB are determined, thus improving the accuracy and speed of recognition.

Below, physiognomic types for respective facial elements will be described in detail with reference to FIGS. 2 to 26.

FIGS. 2 to 6 are diagrams showing the classification of normal chin types based on physiognomic feature information. Referring to FIGS. 2 to 6, the classification of types based on the shape information of a chin, which is one facial physiognomic feature, is illustrated. In the present specification, the normal types of the chin on the face are presented as fives types (rounded chin, branchial chin, pointed chin, angular chin, and square chin), but they may be classified into three to ten various types depending on the resolution of the input facial image and preprocessing performance. When the chin of the user is classified as each type, the degree of similarity, indicating how similar the classified chin type is to the standard type, may be calculated as scores. In the present invention, normal chin type scores are defined as ChinType1Score (rounded, branchial, pointed, angular, and square chins) and respective type values are normalized to be present between 0.0 and 1.0.

Figure 7:
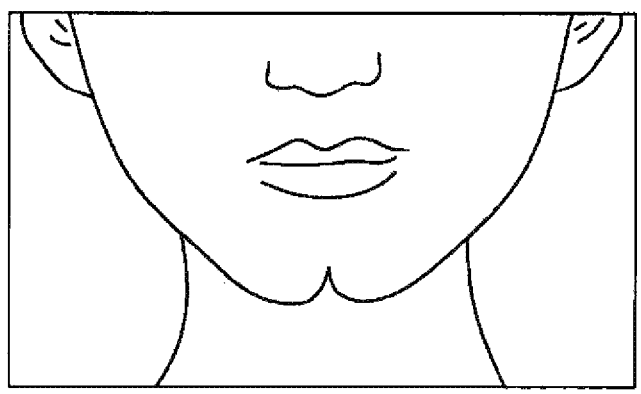
FIGS. 7 to 9 are diagrams showing the classification of special chin types based on physiognomic feature information.
Figure 8:
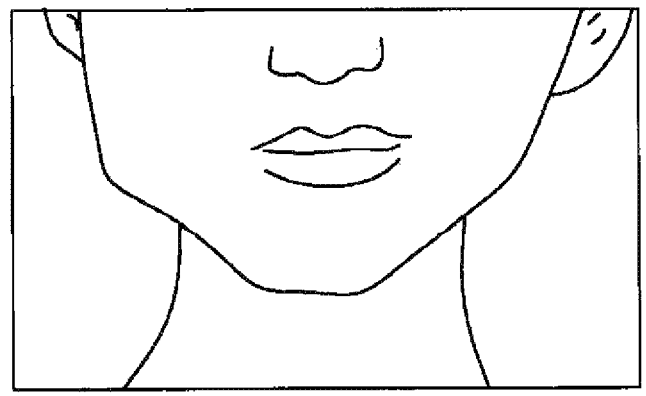
Figure 9:
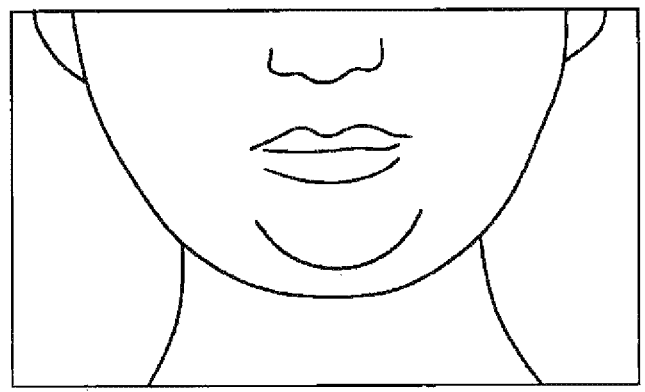

FIGS. 7 to 9 are diagrams showing the classification of special chin types based on physiognomic feature information. Referring to FIGS. 7 to 9, special chin types rather than normal chin types are presented. Special chin types are divided into three (cleft chin, asymmetric chin, and double chin), but other types may be added or deleted depending on the image resolution, similar to the normal chin types. The special chin type scores are defined as ChinType2Score (cleft chin, asymmetric chin, and double chin), and have values between 0.0 and 1.0 for respective types, similar to the normal chin types. Here, a method for identifying whether the user has a chin shape corresponding to any of the special chin types serves is configured to verify whether the special shape of a chin appears at the location of each feature using an existing image processing method.

Figure 10:
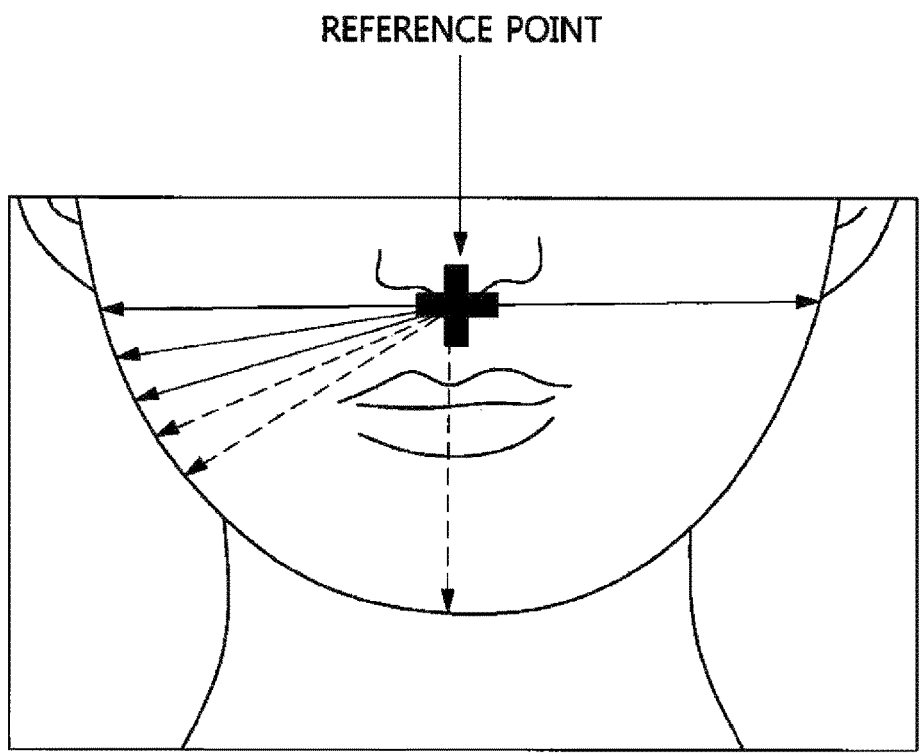
FIG. 10 is a diagram showing the use of information about the reference point of a nose and a jawline as a method for classifying chin types.

As the method for classifying chin types, a method for classifying chin types using the reference point of a nose and jawline information is presented in FIG. 10.

Figure 11:
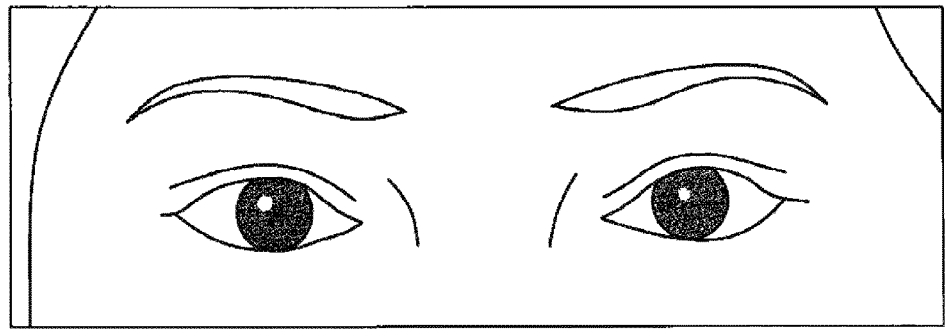
FIGS. 11 and 12 are diagrams showing the classification of eye types based on the presence/absence of double eyelids.
Figure 12:
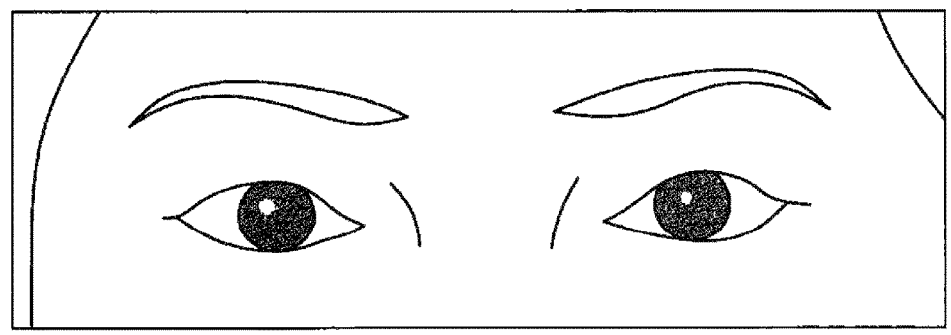

FIGS. 11 and 12 are diagrams showing the classification of eye types based on the presence/absence of double eyelids. In FIGS. 11 and 12, eye types are determined based on whether eyes have double eyelids. On the face of a person, a double eyelid is a very important feature in determining the first impression made by the person, and thus many women have double-eyelid surgery, which is a kind of plastic surgery. When the resolution of the input image is high enough to determine the presence/absence of double eyelids, the presence of such double eyelids may be checked using an image processing method such as edge detection. Double eyelids in the present invention are divided into two types (single eyelids and double eyelids), and the scores for respective types are defined as EylidType-Score (single eyelids and double eyelids), and have values between 0.0 and 1.0 for respective types.

Figure 13:
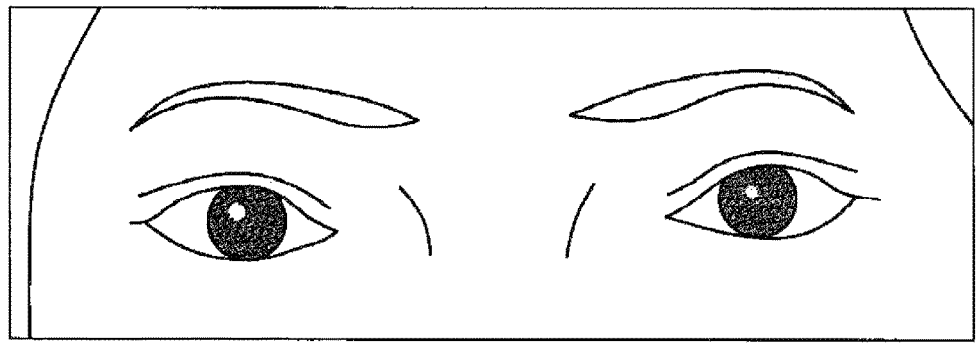
FIGS. 13 and 14 are diagrams showing the classification of eye types based on an interocular distance.
Figure 14:
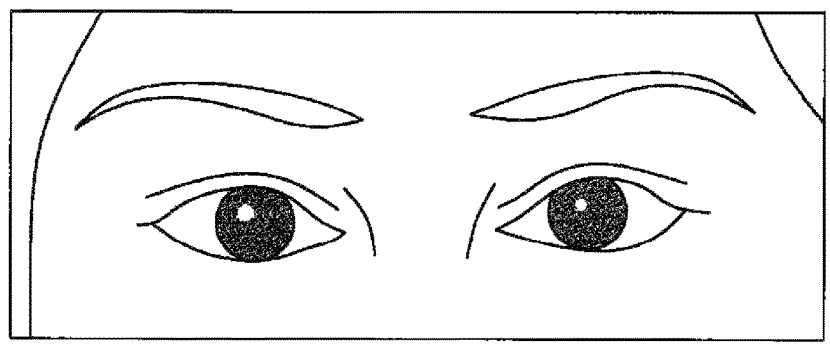
Figure 15:
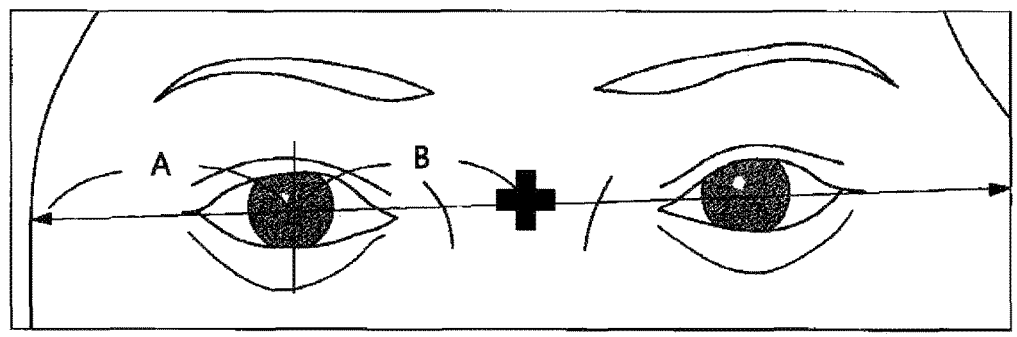
FIG. 15 is a diagram showing a method for calculating the ratio of interocular distances.

FIGS. 13 and 14 are diagrams showing the classification of eye types based on an interocular distance. FIGS. 13 and 14 illustrate the classification of eye types into a long interocular distance type and a short interocular distance type through the calculation of the ratio of defined interocular distances. Here, the scores of two types are defined as EyedistanceTypeScore (long interocular distance and short interocular distance). Similar to other types, the scores for eye types have values between 0.0 and 1.0 for respective types. FIG. 15 is a diagram showing a method for calculating the ratio of interocular distances.

Figure 16:
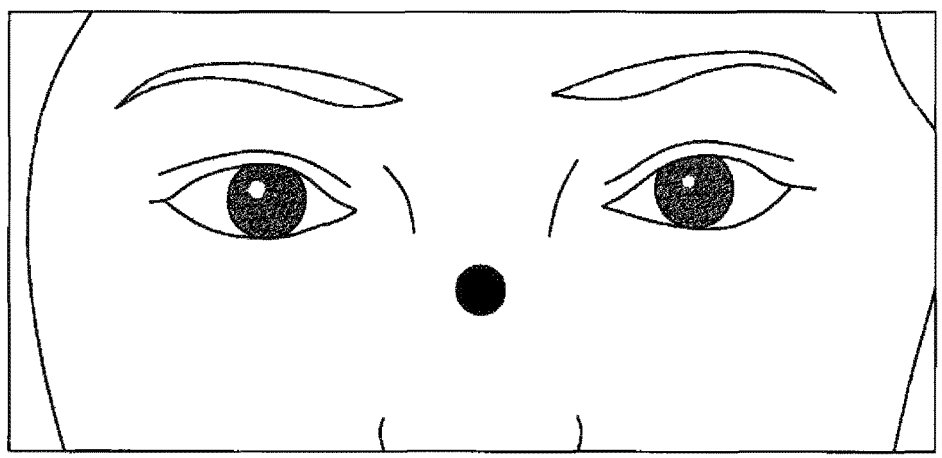
FIGS. 16 and 17 are diagrams showing classification based on the presence/absence and location of a spot.
Figure 17:
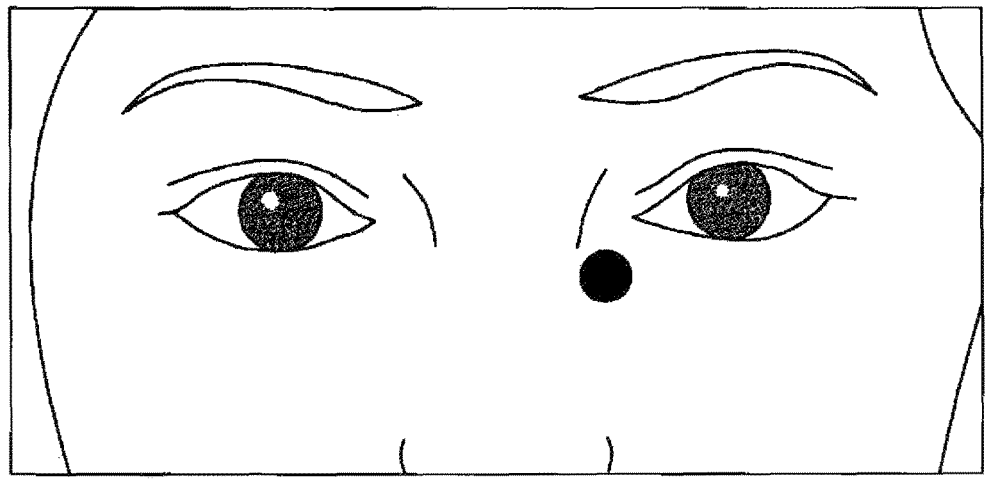

FIGS. 16 and 17 are diagrams showing classification based on the presence/absence and locations of any spots. The sizes, locations, and shapes of spots present on the face may vary, and the number of spots may also vary. Therefore, the present invention defines the number, locations, and shapes of respective spots as DotType, stores spot information in the form of DotType {Location$_1$(x, y), Size$_1$. Shape$_1$. Location$_2$(x, y), Size$_2$. Shape$_2$. Location$_n$(x, y), Size$_n$. Shape}, calculates similarities between registered information DotType { } and currently measured information Dot-Type{ }, and then obtains final spot type scores DotType-Score.

Figure 18:
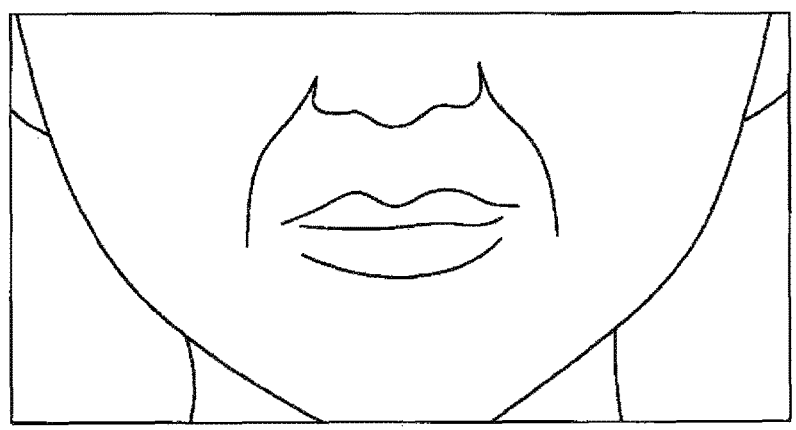
FIGS. 18 and 19 are diagrams showing classification based on the location and shape of wrinkles.
Figure 19:

FIGS. 18 and 19 are diagrams showing classification based on the locations and shapes of wrinkles. Similar to spots, the sizes, locations, shapes and number of wrinkles formed in the face vary. Hence, the present invention stores wrinkle information in the form of WrinkleType {Location-Start$_1$(x, y), LocationEnd$_1$(x, y), Size$_1$. Shaper. Location-Start$_2$(x, y), LocationEnd$_2$(x, y), Size$_2$. Shape$_2$. Location-Start$_n$(x, y), LocationEnd$_n$(x, y) Size$_n$. Shape$_n$}, calculates similarities between registered information WrinkleType{ } and currently measured information WrinkleType{ }, and then obtains final wrinkle type scores WrinkleTypeScore.

Figure 20:
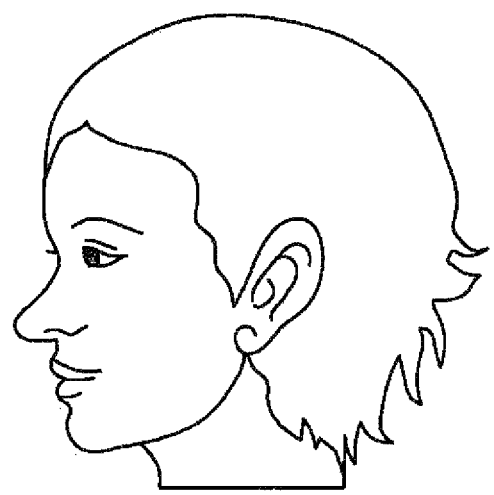
FIGS. 20 to 22 are diagrams showing the classification of nose types based on the shape of a nose.
Figure 21:
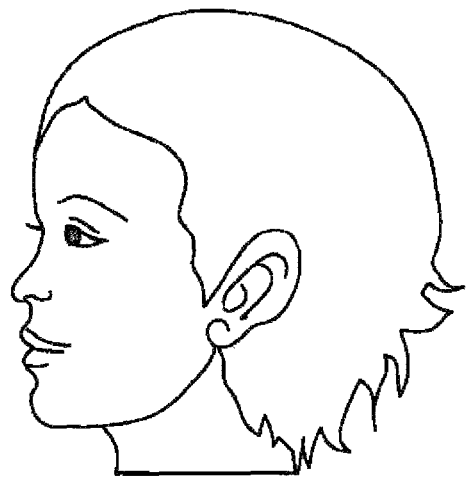
Figure 22:
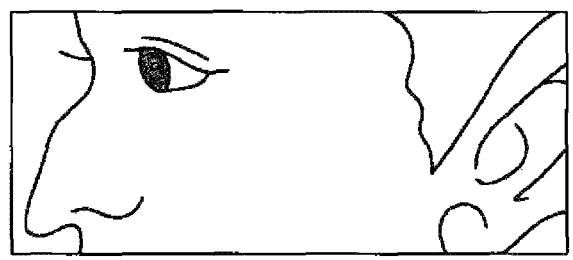
Figure 23:
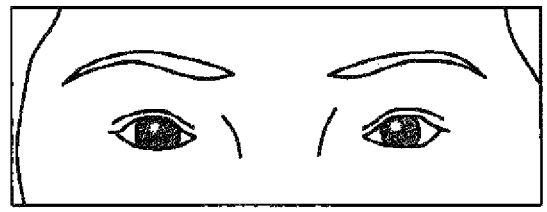
FIGS. 23 to 26 are diagrams showing the classification of eye types based on the shape of eyes.
Figure 24:
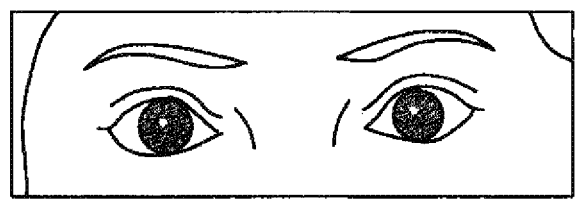
Figure 25:
Figure 26:

FIGS. 20 to 22 are diagrams showing the classification of nose types based on the shape of a nose. The size of the nose may be checked from a front image, but may be more accurately measured if depth information is input through a 3D camera. In the present invention, nose types defined as NoseType are classified into three types (large nose, small nose, and hooked nose), but it is possible to classify nose types into various types depending on the resolution of the input image. Nose type scores defined as NosetypeScore (large nose, small nose, and hooked nose) have similarity values between 0.0 and 1.0 by comparing the currently measured value with the averages of respective types, for respective types.

FIGS. 23 to 26 are diagrams showing the classification of eye types based on the shapes of eyes. In FIGS. 23 to 26, the types of eye features, which are the most important physical features in determining the impression made by the face, are defined. Since respective persons have very different airs depending on the eye types, the classification of the types of eye features is very important, but it is very difficult to identify respective types unless each input image is acquired with sufficient resolution. In the present invention, eye types defined as EyeType are primarily divided into four types (elongated eyes, large round eyes, downturned eyes, and droopy hooded eyes), but may be classified into various types depending on the accuracy of image processing technology or the image resolution. Eye type scores defined as EyeTypeScore may have similarity values between 0.0 and 1.0 by comparing the currently measured value with the averages of respective types.

Finally, although not described in the present invention, various additional physical features, such as the presence/absence of a mustache (or beard), the shape of the eyebrows, the detailed shapes of eyes, the shapes of eye wrinkles, the size of the forehead, and the brightness of the skin, are present on the face. However, it is very difficult, when using normal cameras of the type that are currently used, to accurately extract all physiognomic features and measure similarity values as scores. Thus, the present invention proposes only representative physiognomic features that can be currently specified, among all the physiognomic features, by way of example. By means of the extension of the present invention, other physiognomic features may be used to improve the performance of existing face recognition via a type classification and scoring procedure.

When multiple physiognomic features that can be extracted from the face, which are described above, are used for face recognition, they may be used to have different weights depending on the importance levels of respective physiognomic features. That is, since the similarities of normal chin types and the similarities of special chin types have different importance levels, the importance levels of the proposed physiognomic feature types are measured in relation to how respective types influence face recognition, and then similarities must be integrated in consideration of the importance levels. For this, the present invention presents a method for assigning weights depending on the importance levels of respective types when integrating similarities.

$$TotalScore = Weight_1 * PreviousFaceRecognitionScore + Weight_2 * ChinType1Score \text{ (rounded chin, branchial chin, pointed chin, angular chin, and square chin)} + Weight_3 * ChinType2Score \text{ (cleft chin, asymmetric chin, and double chin)}, \ldots, Weight_7 * EyeTypeScore \text{ (elongated eyes, large round eyes, downturned eyes, and droopy hooded eyes)} + Weight_n * AnotherTypeScore(x,y,z)$$

Here, the total sum of $Weight_1$ to $Weight_n$ is 1.0, and PreviousFaceRecognitionScore may be a similarity value between a registered face and an input face, which is obtained via the basic face recognition method in the present invention.

Hereinafter, the configuration and operation of a face recognition apparatus using physiognomic feature information according to an embodiment of the present invention will be described in detail.

Figure 27:
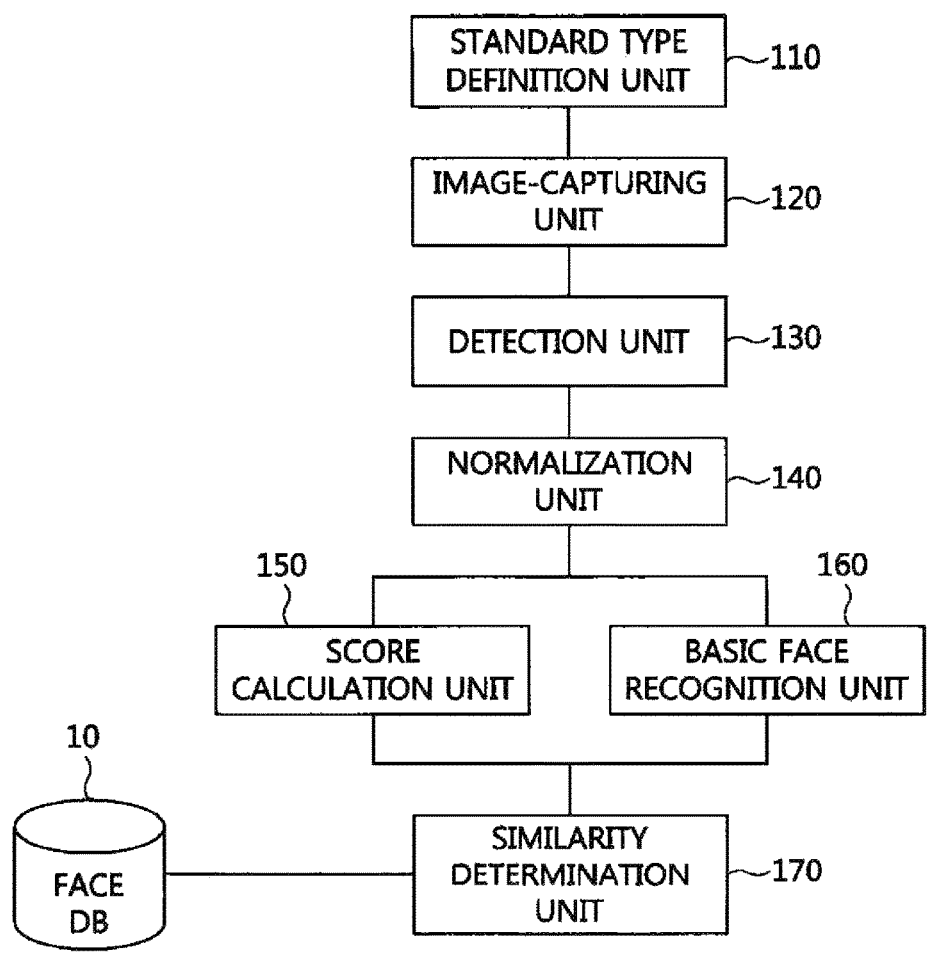
FIG. 27 is a block diagram showing the configuration of a face recognition apparatus using physiognomic feature information according to an embodiment of the present invention.

FIG. 27 is a block diagram showing the configuration of a face recognition apparatus using physiognomic feature information according to an embodiment of the present invention.

Referring to FIG. 27, a face recognition apparatus 100 using physiognomic feature information according to an embodiment of the present invention includes a standard type definition unit 110, an image-capturing unit 120, a detection unit 130, and a score calculation unit 150. The face recognition apparatus 100 using physiognomic feature information according to the embodiment of the present invention may further include a normalization unit 140, a basic face recognition unit 160, and a similarity determination unit 170.

The standard type definition unit 110 defines standard physiognomic types for respective facial elements. Here, the facial elements may include at least one of eyes, a nose, a mouth, a chin, spots, and wrinkles, and the standard type definition unit 110 may define standard physiognomic types based on at least one of the interocular distance, the presence/absence of double eyelids, the size of the eyes, the size and shape of the nose, the shape of the chin, the locations and shapes of any spots, and the locations and shapes of wrinkles.

The image-capturing unit 120 captures a facial image of a user.

The detection unit 130 detects information about facial elements from the facial image.

The normalization unit 140 normalizes the size of a face in the facial image based on the facial element information.

The score calculation unit 150 calculates similarity scores relative to the standard physiognomic types for respective facial elements of the user based on the facial element information. Further, the score calculation unit 150 may calculate similarity scores based on the facial element information of the normalized facial image.

The basic face recognition unit 160 performs basic face recognition based on the global features of the face in the facial image and the locations of the facial elements.

The similarity determination unit 170 determines similarities to facial data registered in advance in a face DB 10 based on the similarity scores. Further, the similarity determination unit 170 may determine similarities to the facial data registered in advance in the face DB 10 based on both the similarity scores and the results of the basic face recognition. Furthermore, the similarity determination unit 170 assigns weights to the similarity scores and to the results of the basic face recognition, respectively, and determines similarities to the facial data registered in advance in the face DB 10. Here, the weights assigned to the similarity scores and to the results of the basic face recognition have values that are greater than 0 and less than 1. The total sum of the weights assigned to the similarity scores and the results of the basic face recognition may be 1. The similarity determination unit 170 may define the standard physiognomic types of the face of the user based on the similarity scores relative to the standard physiognomic types, which are calculated for respective facial elements of the user, and may determine similarities only to pieces of facial data stored in the same types as the standard physiognomic types defined in the face DB 10.

In accordance with the present invention, technology for automatically recognizing the face of each person using physiognomic feature information, which is regarded as an important factor when the person recognizes a face, may be implemented. Further, the present invention may improve the accuracy of face recognition by utilizing various types of physiognomic feature information when performing face recognition.

Furthermore, the present invention may provide more accurate face recognition technology by merging face recognition based on physiognomic feature information with existing face recognition based on global features and the locations of facial elements.

As described above, in the face recognition apparatus and method using physiognomic feature information according to the present invention, the configurations and schemes in the above-described embodiments are not limitedly applied, and some or all of the above embodiments can be selectively combined and configured so that various modifications are possible.

What is claimed is:

1. A face recognition method using physiognomic feature information, comprising:
    defining standard physiognomic types for respective facial elements;
    capturing a facial image of a user;
    performing basic face recognition using global features of a face in the facial image and detecting locations of the facial elements;
    detecting information about the facial elements from the facial image;
    normalizing a size of a face area in the facial image based on the facial elements;
    calculating similarity scores relative to the standard physiognomic types for the respective facial elements of the user based on the facial elements;
    assigning weights to the similarity scores and to results of the basic face recognition, respectively; and
    determining similarities to facial data registered in advance in a face database (DB) based on the weighted similarity scores and the weighted results of the basic face recognition.

2. The face recognition method of claim 1, wherein the facial elements include at least one of eyes, a nose, a mouth, a chin, spots, and wrinkles, and
    the standard physiognomic types are defined based on data including at least one of an interocular distance, presence/absence of double eyelids, a size of the eyes, a size and a shape of the nose, a shape of the chin, locations and shapes of the spots, and locations and shapes of the wrinkles.

3. The face recognition method of claim 1, wherein
    the weights assigned to the similarity scores and to the results of the basic face recognition have values that are greater than 0 and less than 1, and
    a total sum of the weights assigned to the similarity scores and to the results of the basic face recognition is 1.

4. The face recognition method of claim 2, wherein in response to detection of the facial elements correspond to the chin,
    defining at least one of normal chin types including a rounded chin, a branchial chin, a pointed chin, an angular chin, and a square chin, and special chin types including a cleft chin, an asymmetric chin, and a double chin, as the standard physiognomic types for the chin based on preset criteria.

5. The face recognition method of claim 2, wherein in response to detection of the facial elements correspond to the spots or wrinkles,
    defining the standard physiognomic types depending on locations, shapes, and a number of spots or wrinkles based on preset criteria.

6. The face recognition method of claim 1, further comprising:
    defining standard physiognomic types of the face of the user based on the similarity scores relative to standard physiognomic types, which are calculated for respective facial elements of the user, and
    determining similarities in response to detection of facial data stored in types identical to the defined standard physiognomic types in the face DB.

7. The face recognition method of claim 1, further comprising:
    subsequent to detecting the information of the facial elements,
    performing preprocessing for normalizing a size of a face in the facial image based on the information of the facial elements,
    calculating similarity scores based on the information of the facial elements of the facial image on which the preprocessing having been performed.

8. The face recognition method of claim 1, further comprising:
    capturing the facial image of the user using a normal camera and a 3D depth camera.

* * * * *